(No Model.) 5 Sheets—Sheet 2.
O. B. PECK.
CENTRIFUGAL SEPARATOR.
No. 560,634. Patented May 19, 1896.
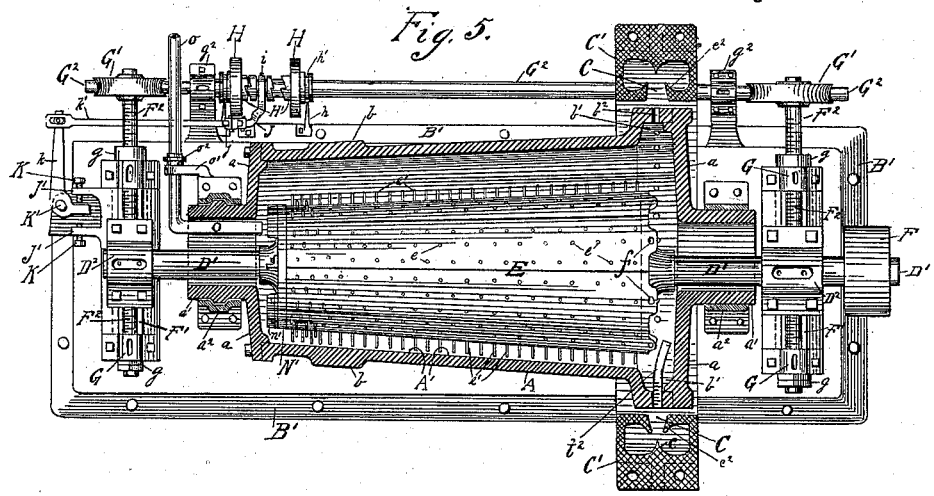
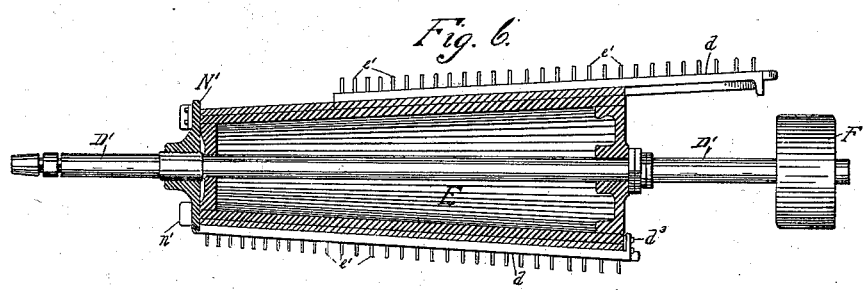
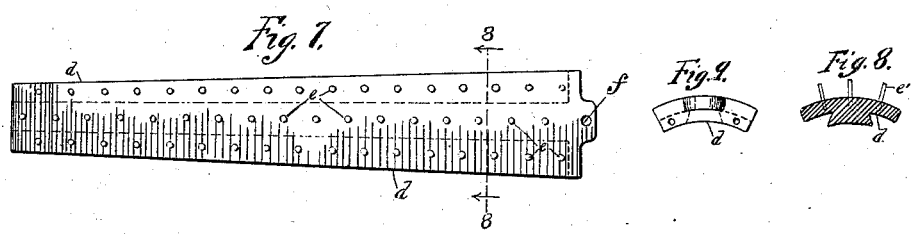  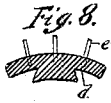
Witnesses:
Jno. White
M. F. Bray
Inventor;
Orrin B. Peck (No Model.) 5 Sheets—Sheet 3.

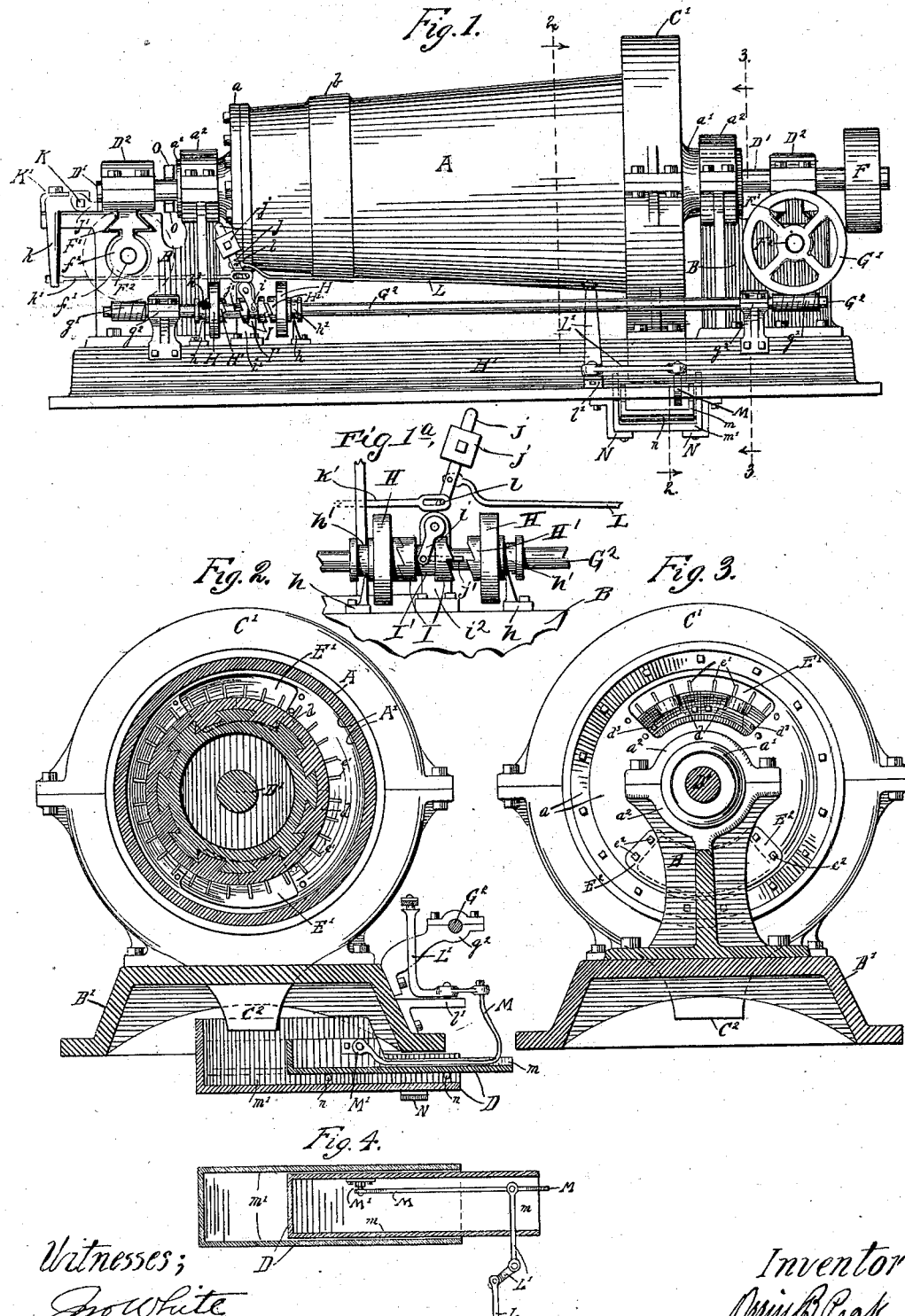

O. B. PECK.
CENTRIFUGAL SEPARATOR.

No. 560,634. Patented May 19, 1896.

Witnesses:
Jno. White.
M. F. Bray.

Inventor:
Orrin B. Peck (No Model.) 5 Sheets—Sheet 4.
O. B. PECK.
CENTRIFUGAL SEPARATOR.
No. 560,634. Patented May 19, 1896.
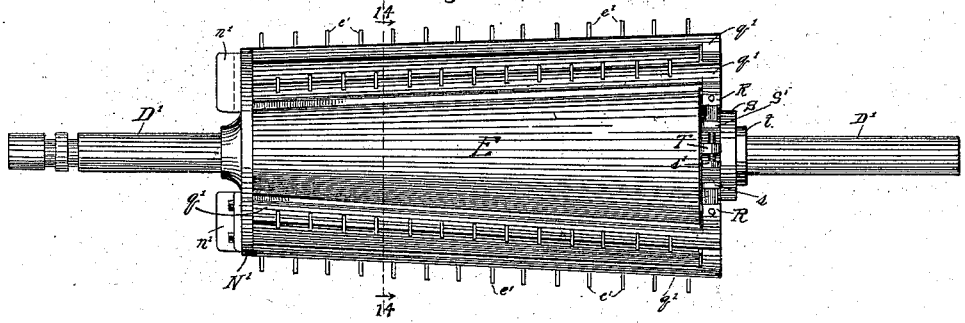
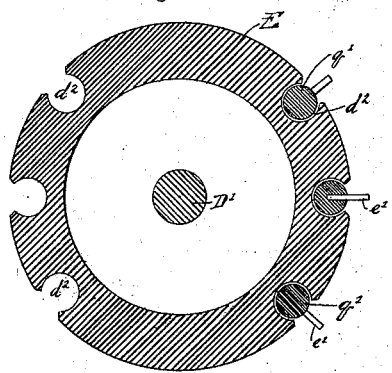
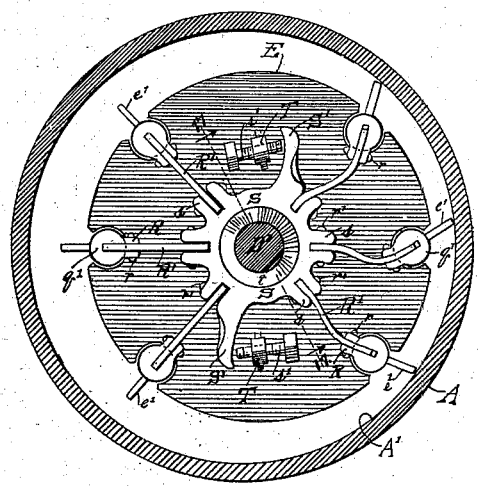
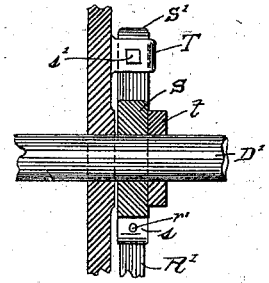
Witnesses:
Jno. White.
M. F. Bray.
Inventor:
Orrin B. Peck (No Model.)  5 Sheets—Sheet 5.
O. B. PECK.
CENTRIFUGAL SEPARATOR.
No. 560,634. Patented May 19, 1896.
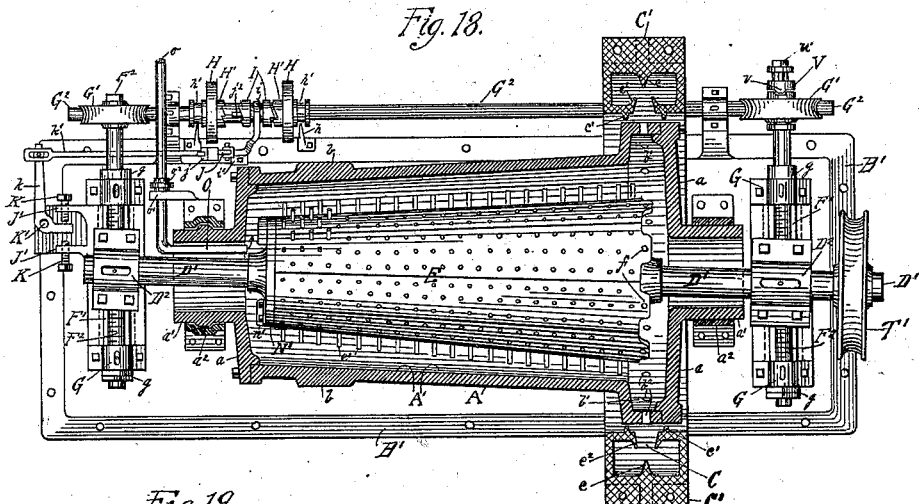
Fig. 18.
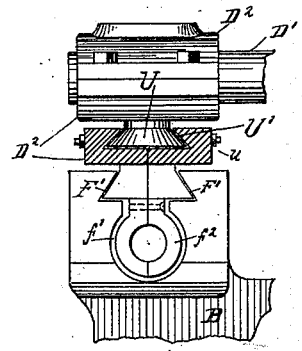
Fig. 19.
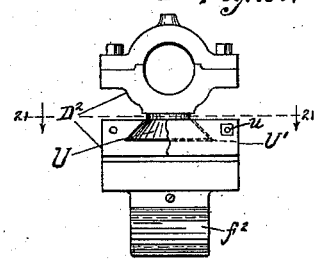
Fig. 20.
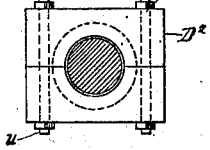
Fig. 21.
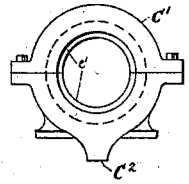
Fig. 22.
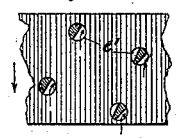
Fig. 24.
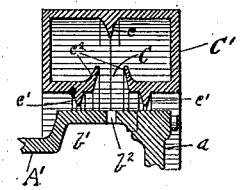
Fig. 23.
Fig. 25.
Witnesses;
Inventor;
Orrin B. Peck

UNITED STATES PATENT OFFICE.

ORRIN B. PECK, OF CHICAGO, ILLINOIS.

CENTRIFUGAL SEPARATOR.

SPECIFICATION forming part of Letters Patent No. 560,634, dated May 19, 1896.

Application filed November 21, 1894. Serial No. 529,515. (No model.)

*To all whom it may concern:*

Be it known that I, ORRIN B. PECK, a citizen of the United States, residing in Chicago, in the county of Cook and State of Illinois, have invented new and useful Improvements in Centrifugal Separators, of which the following is a specification.

The principal objects of my invention are to provide a centrifugal separator in which the agitating means or the portions or sections to which they are secured may be removed from the separator and readily replaced without taking the main central portion or the treatment-cylinder from its place, to provide means whereby the agitators may be moved faster or farther from the separating-surface at one end of the treatment-cylinder than at the other, and to otherwise improve details of construction of the separator. I accomplish these objects by the mechanism illustrated in the accompanying drawings, in which—

Figure 10:
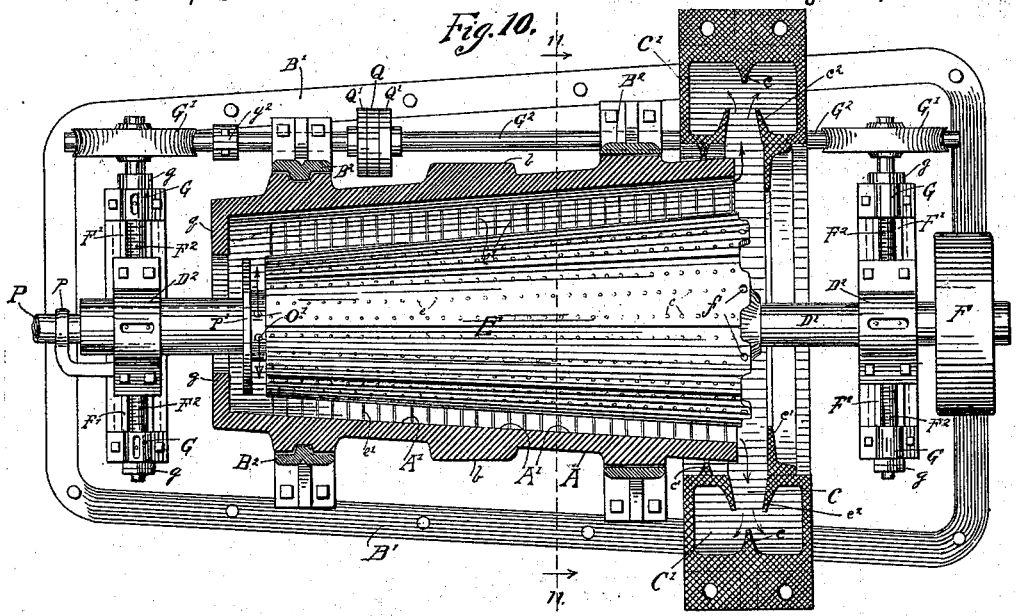
Figure 11:
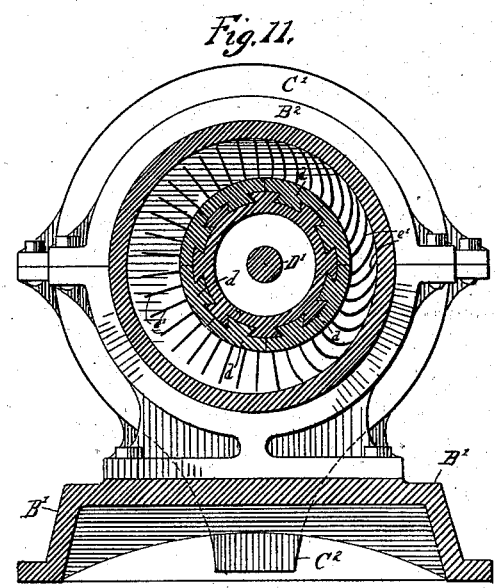
Figure 12:
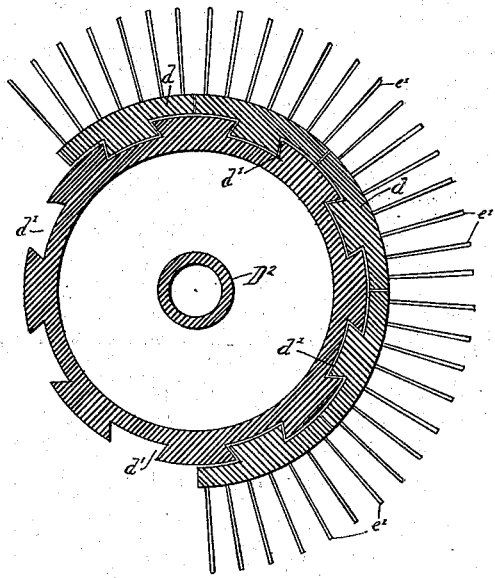

Figure 1 is a side elevation of one of my improved separators, showing a worm-wheel at the left removed, its location being shown in dotted lines. Fig. 1$^a$ is a detail in elevation of the clutch mechanism of Fig. 1. Fig. 2 is a transverse vertical section on the line 2 2 of Fig. 1, looking in the direction of the arrows. Fig. 3 is a transverse vertical section on the line 3 3 of Fig. 1, looking in the direction of the arrows, the worm-shaft and some other parts not being shown. Fig. 4 is a detail top plan view of the sliding trough and some of its actuating-levers. Fig. 5 is an axial horizontal section of a separator like that shown in Fig. 1, with the treatment-cylinder in section and the trough-shifting mechanism omitted. Fig. 6 is an axial longitudinal section of the central sectional portion or deflector carrying the agitating means, with one of its removable sections partly withdrawn. Fig. 7 is an enlarged detail of one of the removable sections. Fig. 8 is a section on the line 8 8 of Fig. 7, somewhat reduced in size. Fig. 9 is an elevation of the right-hand end of Fig. 7. Fig. 10 is an axial horizontal section of a separator somewhat modified. Fig. 11 is a transverse section on the line 11 11 of Fig. 10, looking in the direction of the arrows. Fig. 12 is an enlarged transverse section of the inner sectional cylinder or deflector shown in Figs. 10 and 11, with some of the sections withdrawn and with a hollow central shaft. Fig. 13 is a side elevation of another form of deflector with yieldable agitators and means for regulating their resistance. Fig. 14 is a transverse section on the line 14 14 of Fig. 13, looking in the direction of the arrows, with part of the portions carrying agitators removed. Fig. 15 is a right-end elevation of Fig. 13, showing the deflector and agitators in position in the treatment-cylinder, which is shown in section. Fig. 16 is a detail in elevation of one of the removable portions carrying agitators shown in Figs. 13, 14, and 15, with a portion of regulating-spring attached. Fig. 17 is a sectional detail on the line 17 17 of Fig. 15, looking in the direction of the arrows. Fig. 18 is an axial horizontal section of a separator in most respects like that shown in Fig. 5, but with means for moving the deflector and the separating-surface apart faster at one end than at the other. Fig. 19 is an enlarged detail side elevation of the left-hand end of the deflector-shaft and its traveling journal-box, showing the manner in which the box is secured to its base. Fig. 20 is an elevation of the left-hand end of the journal-box and its attached parts, shown in Fig. 19. Fig. 21 is a horizontal section on the line 21 21 of Fig. 20, looking in the direction of the arrows. Fig. 22 is a side elevation of the discharge-hood removed from the separator, much reduced in size. Fig. 23 is a transverse section of one side of the hood and a portion of the treatment-cylinder. Fig. 24 is an enlarged detail of a portion of the outside of one of the removable sections of the deflector, showing the preferred shape of the agitating or plowing studs; and Fig. 25 is a perspective detail of one of the agitating studs or plows removed.

The treatment vessel or cylinder A is provided with a separating-surface A' and heads or ends $a$, having hollow trunnions $a'$, which serve as bearings, journaled in suitable boxes $a^2$ on supporting-frames B, which are preferably mounted on a bed-plate B', or, if desired, the treatment-cylinder may be rotatably journaled in bearings B$^2$, surrounding the body of the cylinder, and the trunnions dispensed with, as particularly shown in Fig. 10.

The treatment vessel or cylinder, which for brevity I will call a "cylinder" or "treatment-cylinder," is preferably provided with an encircling belt-surface $b$, over which a belt for imparting rotation may pass, and when made with a head at the discharge end they are preferably provided with an enlarged portion, forming an interior annular recess $b'$, from which discharge-orifices $b^2$ radiate. Surrounding the discharge-orifices and provided with an annular channel C, communicating through its inner wall, is a hood or trough $C'$, provided with a discharge-passage, preferably through a downwardly-extending and contracted portion $C^2$ at its lower side. This hood is so located that the channel C will be in a position to receive the material and water discharged from the treatment-cylinder. Within this hood, opposite the channel C and throughout a large portion of its circumference, is preferably provided an inwardly-extended rib $c$, terminating in a thin or narrow edge nearest the axis of revolution, which serves to deflect the water and material discharged into the hood to its sides and facilitates its discharge from the hood. At each side of the annular channel C, extended toward the axis, is an annular rib $c'$, (see Fig. 18,) which serves to assist in preventing water and material from spattering or being carried out and away from the hood by the current of air caused by the high velocity of rotation of the cylinder, and within the hood, located at each side of the channel C, are ribs $c^2$, extending in toward the back of the hood, serving to assist in retaining the discharge into the hood. These parts are most clearly illustrated in Figs. 10, 18, 22, and 23. Under the discharge-passage from the hood is preferably located a trough D, which will be hereinafter more fully described.

Within the treatment-cylinder and supported on a shaft $D'$, journaled in boxes $D^2$, is a cylinder or deflector E, which is provided with removable sections or portions $d$. These sections may be bars or plates and, as shown in part of the figures of the drawings, formed to slide in dovetailed channels $d'$ in the deflector or supporting frame or cylinder E, or, as shown in Figs. 13, 14, 15, and 16, these bars, which are lettered $q'$, may be round and adapted to be inserted in channels $d^2$ about the circumference of the supporting-frame, the channels being round and having that portion of their wall nearest the surface of the supporting-cylinder cut away to permit the protrusion of the agitators. The plates or bars when in place preferably form, with their support, a deflector to guide material along near the separating-surface, as well as a support for agitators and plows, as will be hereinafter described. By the removal of the fastenings $d^3$, Fig. 6, the bars or sections can be readily withdrawn from their places in the support.

The outer surfaces of the removable sections are preferably provided with a desired number of preferably screw-threaded perforations $e$, which are supplied with removable screw-threaded studs, pins, or wires $e'$, which serve as agitating and plowing means, their outer ends extending a proper distance from their supporting-bars to effect the purposes hereinafter described. The outer or surface ends of the studs, when made sufficiently large to permit it, are preferably formed to serve as plows as well as agitators, to plow or deflect material on which they operate toward the discharge end of the treatment-cylinder. This may be accomplished by flattening the ends of the studs on one or both sides and setting them in the supporting-cylinder in such a position that their flattened side is at an angle or in an oblique position to the path of rotation. This position is shown in Fig. 24, the small arrows showing the manner of deflection or plowing of material and the large arrow at the left of the figure showing the relative direction of rotation of the treatment-cylinder and the plows. Throughout several figures of the drawings the flattened shape and oblique position of the agitating-studs are not shown, as they are so small that they cannot be readily distinguished if illustrated, but it is preferable to form and use them much as shown in Figs. 24 and 25. In some instances the plows or studs may be made much larger than illustrated and operate to advantage.

To enable the sections to be withdrawn from the treatment-cylinder for the replacement of the agitators or other purposes when heads or ends are used in the cylinder, I provide one or more openings or hand-holes $E'$, as particularly shown in Figs. 2 and 3, properly located to register with that end of the removable bars by which they are withdrawn, so access may be had to the same without removing their support or displacing the treatment-cylinder. After the agitators have been renewed in the removed portions, such portions may be replaced in the same way, or if desired two or more sets of the removable bars may be made interchangeable, and while one set is having its agitators replaced another set can be inserted in the separator, resulting in convenience and the saving of time. The ports or hand-holes are preferably covered when the separator is operating by plates $E^2$, removably secured in place by bolts $e^2$ or other suitable way.

When the treatment-cylinder is made as shown in Fig. 10, the hand-holes are not required, as the sections may be withdrawn through the open end. I prefer to provide holes $f$ in the slightly-extended ends of the removable portions, to be engaged and withdrawn by means of a suitable hook or other tool.

As shown in Figs. 6 and 13, the shaft $D'$ and its journal-box are provided with annular recesses and projections engaging to maintain the desired longitudinal position of the shaft, and the other end is extended sufficiently to receive a driving-pulley F, through which rotation is imparted to the shaft and connected parts. The boxes D² in which this shaft is journaled have their bases mounted to slide in channels or ways F', which are sufficiently long to admit of movement transverse to the axis of rotation of the shaft and treatment-cylinder toward and from the separating-surface. Preferably under the base or lower side of each of these boxes, in a space or channel $f'$ in the supporting-bracket B and passing through depending internally-screw-threaded nuts $f^2$, secured to the under side of the box, is a rotatable screw-threaded rod F², supported in journal-boxes G and held from longitudinal movement by the collars and nuts $g$ or other suitable means. One end of each rod is extended sufficiently to receive a rigidly-mounted worm-wheel G', except as hereinafter explained with reference to Fig. 18. The worm-wheels G' engage with worm-gears $g'$ on a shaft G², which is rotatably supported in bearings $g^2$ in a position parallel to and somewhat above the base-plate of the separator. On this shaft are loosely mounted two belt-pulleys H, maintained in proper relative position by studs $h$, projecting into annular channels $h'$ in the extended hubs of the pulleys.

The pulleys H are revolved in opposite directions, and their inner hubs are provided with oppositely-inclined cam-surfaces H', which are respectively adapted to engage similar surfaces on the opposite ends of a sleeve I, which is splined on the shaft G² between the pulleys H. The sleeve slides freely on the shaft, but compels its rotation. It is provided with a channel I' near its central circumference, in which studs extend from the depending arms $i$ of the lever J. This lever is pivoted at a point below its center to a supporting-bracket $i'$, and is preferably provided with a weight $j$ near its upper end, so that when the lever is so tilted in one direction or the other that the weight has passed over its center of pivotal support it will fall by gravity the predetermined distance, carrying the lever and sliding the sleeve in one direction or the other, bringing the cam-surfaces on one of its ends into engagement with the cam-surfaces of the appropriate pulley-hub. The sleeve will therefore be rotated in one direction or the other as the particular pulley with which it has become engaged is rotating through its connection with the shaft G² by a spline $j'$, will rotate it, and through the worms $g'$ and worm-wheels G' will turn the threaded rods F², which by reason of their engagement with the nuts $f^2$ will move the boxes D², the shaft B', and the deflector E in the one direction or the other transversely to the axis of rotation, thus causing the end of the studs $e'$ to approach nearer to or recede from the separating-surface.

One of the traveling boxes preferably has two arms J', which extend a short distance apart and in the same horizontal plane, as shown in Fig. 5 of the drawings. Through these arms project set-screws K with their points extended inward, adapted to be adjusted through the arms. Pivotally fulcrumed at a point K' to a stationary part of the supporting-frame is a bent lever $k$, with its short arm extending between the set-screws K, as particularly shown in Fig. 5. When the set-screws have been adjusted to the desired relative positions, the end of one or the other will contact with the lever $k$, and as the traveling box carrying these screws moves it will carry the end of the lever with it. This movement of the short arm of the lever will swing its longer arm a greater distance, carrying with it a rod $k'$, which is linked thereto, and through this rod the lever $k$ will move the lever J sufficiently to carry the weight $j$ the necessary distance past its pivotal support, when it will fall, carrying with it the lever J. This slides the sleeve I along the shaft G², disengaging it from the cam-surfaces on the hub of one pulley and bringing it into engagement with the cams on the other, which, as hereinabove stated, is being rotated in the opposite direction. By this arrangement the direction of rotation of the sleeve will be reversed, changing the direction of rotation of the shaft D', and consequently, through the interposed gearing, will reverse the direction of transverse movement of the traveling boxes and the deflector within the treatment-cylinder. The connections between the levers and rods throughout this mechanism are made through sufficiently elongated or slotted holes to permit the lever to be carried the necessary distance by the gravity of the weight to effect the reverse motion desired. The screws K are to be adjusted to a position, through their supporting-arms, to contact with the short arm of the lever $k$ at such a time during the operation of the separator that the weighted lever and its connecting parts will automatically reverse the transverse movement of the deflector, thereby causing the agitating projections to be carried toward and from the separating-surface the desired and predetermined extent for the purposes hereinafter described. A greater movement may be secured by adjusting the points of the screws K farther apart, and vice versa, and the travel of these parts may be effected through any particular portion of their path by properly relatively adjusting the positions of the screws in and out to effect the reverse motion when desired.

At a suitable place on the lever J is hinged one end of a rod L through an elongated hole $l$, its other end connecting with the upturned end of the short arm of an angular lever L', Figs. 1, 2, and 4, which is pivotally fulcrumed to a bracket $l'$, attached to the base-plate of the separator. This lever L' is also pivoted at its opposite end to the upturned end of a rod M, which extends backward into the inner or sliding portion $m$ of the trough D and is pivotally attached at M' to the same.

The trough is preferably composed of a stationary outer trough or portion $m'$ and an inner sliding portion $m$. They are located transversely to the base-plate under the discharge-passage of the hood C', and the outer portion is supported in depending brackets N, while the inner rests on rods $n$, so that it may be freely slid back and forth in either direction. The sides and end of the outer trough under the separator are preferably extended well above the discharge-orifice of the hood, while the inner has an end extending up a sufficient distance from its bottom to permit the discharged material and water from passing into the outer trough when the inner is slid beneath the discharge-passage $C^2$, and vice versa. The end of the inner trough should be low enough to pass under the hood as it is slid back and forth. The movement of the trough $m$ is sufficient to bring its inner end either one side or the other of the discharge-passage, so that material and water will all be received at one time by either the inner or outer trough and carried off thereby. It will be seen that by the arrangement of these parts and their connection with the weighted lever the trough $m$ will be automatically shifted in one direction or the other as the weighted lever falls, changing the flow of material being discharged at the time from one trough to the other, which change occurs at the time the direction of transverse travel of the deflector within the treatment-cylinder is automatically reversed. The troughs deliver into suitable conduits for separately conveying the material to separate receptacles. Certain means have been disclosed for shifting the trough and changing the direction of travel of the deflector, but I do not wish to confine myself to the exact details of construction, as various means can obviously be used to automatically or otherwise accomplish the desired results.

Preferably secured to the end of the deflector nearest the feed end of the treatment-cylinder and occupying the space between these two at this point is a disk or plate N', having radial flanges or wings $n'$ on its outer side, which in their revolution serve to force the water and material around as it is introduced, quickly subjecting it to the action of centrifugal force and thereby very soon starting its flow through the treatment-cylinder toward the discharge end.

When trunnions $a'$ are used, they are made with a sufficiently-large opening to not only admit of the passage of the shaft D', but to also allow the transverse movement thereof and to admit the entrance of a feed pipe or conduit O to the treatment-cylinder. This conduit is supported by a bracket $o'$ and may be made in any desired manner to effect the introduction of material, being attached to a supply-pipe $o$ by a union $o^2$ or other convenient way.

In the form shown in Figs. 10, 11, and 12 the deflector-shaft near the feed end is hollow, and is provided with radial passages O'. The material and water are fed into the shaft by a pipe P, extending therein, which may be held in position by a bracket $p$, and from thence flow into the treatment vessel through holes O'. Between this end of the cylinder and the feed-passages O' is a plate P', secured to the deflector or its shaft, which serves to prevent the water and material from spattering out of the opening in the end of the cylinder. In this form of separator the agitators are composed of wire or other suitable flexible or yieldable material and are preferably of considerable length, so that as they contact with the material on the separating-surface they will bend or be deflected back, as particularly shown in Fig. 11. These flexible agitators are not intended to be stiff enough to agitate the heavier substances sufficiently during separation to cause their removal and discharge, but are strong enough to afford a resistance sufficient to stir or agitate the lighter to facilitate its separation and discharge during the separating period. Their tension or force of resistance may be regulated by the size, stiffness, or temper of the wire or other material used in making.

In Fig. 10 I have omitted the automatic shipping mechanism and simply shown tight and loose pulleys Q' Q mounted on the shaft $G^2$, over which belts running in opposite directions may pass and be shifted at the proper times in any of the well-known ways, thus securing the desired reverse movement of the boxes $D^2$ and parts carried by them. The trunnion and head at the discharge end of the cylinder are entirely omitted, and the feed end is only provided with a flange $q$ to keep material and water from flowing out there.

In Figs. 13, 14, 15, 16, and 17 are illustrated yieldable agitators somewhat modified with means for supporting them and regulating their force of resistance to material with which they contact on the separating-surface. In this instance the supporting-cylinder E is preferably provided with longitudinal channels $d^2$, circular in section and cut out on the side next to the circumference of the cylinder to form open channels with overhanging circular walls open in a direction from the axis of rotation of the cylinder. These channels are adapted to receive round bars $q'$ of such a size as to permit them to be slid therein endwise and rotated or turned, as desired. The bars are preferably provided at one end with a head or angular extension R, having slots in which one end of preferably flat springs R' are inserted. These springs are held therein by fastenings $r$, as especially shown in Fig. 16, passing through the head of the bar and through a slotted hole in that end of the spring, which serves to permit the spring to be slightly withdrawn as it is bent or deflected in service. Preferably abutting against that end of the deflector from which the bars are withdrawn, or in close proximity thereto, and rotatably mounted upon the shaft D', is a hub or portion S, provided with radial lugs s, between which are slots in which one end of the springs R' are inserted and secured by fastenings r', as particularly shown in Fig. 15. The hub S is also provided with two radial arms S', which contact with the ends of set screws or bolts s', screwed through lugs T, rigidly secured to the end of the deflector or supporting-cylinder, affording a stop to the rotation of the hub in that direction. The hub S is held from endwise movement along the shaft by a collar t at one side and its contact with the deflector on the other.

Along the side of the bars are provided agitating projections so located as to permit the bars to be inserted in their respective channels with the agitators extending through the open side and leave sufficient clearance for the bars to be rotated somewhat. This allows the agitators to be deflected back to a position oblique to a radius of the supporting-cylinder. The springs R' resist the rotary movement of the bars, and consequently the deflection of the agitators, and by screwing the bolts s' a greater or less distance through their lugs the position of the hub may be changed, thus regulating the resistance of the springs, and consequently the force of resistance of the agitators to the material on the separating-surface can be governed or regulated.

In many instances it will be found that separation will be facilitated and a greater degree of efficiency secured by operating the separator with the separating-surface and the material thereon in a submerged state or covered with a considerable layer of water and by creating a strong current thereof circumferentially over the separating-surface in its path of rotation, and at the same time a more moderate current longitudinally of the cylinder than would otherwise be the case. Without this circumferential current, especially when adequate plowing means are not employed, it is necessary to provide a current of considerable velocity in a direction transverse to the path of rotation to move the lighter particles from the separating-surface while being acted upon by centrifugal force, their principal resistance to such current being their frictional contact or adhesion to the surface over which they must pass, and this transverse flow being longitudinal of the cylinder toward its discharge end, when the same is sufficiently accelerated to overcome the frictional resistance of the lighter particles of material, very quickly carries them over the separating-surface, giving but short time for separation and the lodgment of the heavier substances; but when a strong "circumferential" or "annular" current, as it may be termed, is employed the frictional resistance of the lighter particles may be very largely, if not wholly, overcome by such current, which will drive them circumferentially over the separating-surface in the path of rotation, and therefore a more moderate transverse current will suffice to gradually deflect or move them toward the discharge end in a substantially helical path, thereby permitting them to remain in the treatment-cylinder a greater length of time to effect a more perfect separation. The efficiency may be further increased by the employment of the oblique pins, studs, or plows, which will plow the material toward the discharge-point, and thereby further assist the transverse current in the movement of material. The circumferential current over the separating-surface may be secured by making the discharge-orifices from the treatment-cylinder somewhat contracted and supplying a quantity of water sufficient to maintain a layer over the separating-surface of a greater depth than the distance between that side of the deflector nearest the separating-surface and the surface of the accumulated material thereon. The result is that at each revolution of the treatment-cylinder all parts of the separating-surface pass under the contracted space between it and the deflector, and as the layer of water cannot pass through the space as rapidly as the separating-surface is revolving thereunder it follows that more or less of the water is crowded back, the separating-surface slipping under it and the water relatively flowing back circumferentially over the separating-surface. The velocity of this current may be regulated by the velocity of revolution of the separating-surface, by the closeness to the separating-surface at which the deflector operates, thereby determining the space through which the water flows, and by the amount of water kept in the cylinder during the operation. To insure that only a fixed maximum quantity of water shall accumulate within the treatment-cylinder, overflow-pipes $t^2$ are provided, preferably several in number, only one of which appears in Fig. 5, extended toward the axis of rotation to a point where it is desired that the inner surface of the maximum accumulation of water shall reach. These pipes permit any excess of water introduced into the cylinder to be readily discharged therethrough. It is preferable, however, that the feed to the cylinder should be so regulated with reference to the discharge through the small discharge-orifices that ordinarily little or no water shall pass through the overflow-pipes.

Over that portion of the separating-surface near the discharge end, especially when it is not kept well submerged, the accumulating layer of heavier material, when of considerable depth, is irregularly channeled or grooved by the increased velocity or flow of water at this point, caused by said layer becoming beveled or washed off by the water into wedge shape, thereby affording a more rapidly-diverging surface for the water and material to flow over. This is permitted by the agitators receding at this point and permitting the layer to form out to or very near the point of discharge. The channeling causes the water to flow with greater velocity at these points and tends to effect the discharge of heavier substances with the lighter; but by moving the agitators slightly or not at all at this end it is prevented, the thickness of the accumulation being kept slight near the discharge by their action and gradually increasing back toward the center of the cylinder.

To enable the deflector and the agitators to be differentially moved from their initial point of action with regard to the separating-surface—that is, more rapidly or to a greater extent near the discharge end than at the feed end—the traveling journal-boxes $D^2$, as illustrated in Figs. 19, 20, and 21, are provided with a turreted, swiveled, or rotatable joint, formed by a portion U, fitting in an annular recess U', so that as the shaft D' is moved to an oblique position with relation to the axis of the cylinder the upper portion of the box can rotate, and thus maintain proper alinement with its shaft. This difference in the transverse movement of the deflector and agitators in different portions of the treatment-cylinder can be secured by making the threads finer on rod $F^2$ at the end at which it is desired to secure the retarded movement or by revolving this rod slower, or, if desired, it may remain stationary.

In Fig. 18 the end of this rod $F^2$ is shown extending out somewhat, provided with a nut $u'$, and with a sliding sleeve V splined to the rod. This sleeve is provided with clutch-jaws $v$, adapted to engage corresponding jaws on the hub of the worm-wheel G', which is loosely mounted on the rod $F^2$, so that when the sleeve is drawn out and its jaws disengaged from those on the hub of the wheel the latter will rotate on the threaded rod, and consequently the box at this end will remain stationary, except that its upper portion will turn to the necessary extent to keep in proper alinement with the shaft, and the deflector, with its agitators nearest that portion of the separating-surface toward the discharge-point will be but slightly moved therefrom, the extent of this movement gradually becoming greater as the opposite or feed end is approached. If desired, the traveling journal-box and its shifting mechanism can be dispensed with at this end, and the box merely provided with the swiveled or rotatable support to enable it to be maintained in proper alinement with the shaft as the same is moved by its traveling journal-box at the other end.

To enable the lower part U of the upper portion of the boxes to be inserted into the recess U' in the base, the latter is made in two halves and joined together with bolts $u$. If desired, of course other means may be used to rotatably support the journal-bearings, and I therefore do not wish to be confined to the specific details of construction thereof.

To impart rotation to the central shaft D' while it is being carried out of line, a grooved pulley T' is provided, over which a rope or cable belt may be operated.

The operation of these separators is in successive alternations of the separation and accumulation of a layer of heavier material on the separating-surface while discharging the lighter and then removing the accumulated heavier, diverting the two to different places of deposit. The treatment-cylinder and deflector are rotated at a relatively greater or less speed, as will suit the peculiar conditions existing. The material to be separated is introduced through the feed pipe or conduit O, preferably in a finely-divided state, and mixed with a considerable amount of water, so it will flow freely through the separator.

At the beginning of the operation of separating and accumulating a layer of heavier material on the separating-surface the sliding boxes are in a position sufficiently near to the side of the treatment-cylinder to bring the agitators or plows close to the separating-surface, thereby stirring and agitating the material on or near said surface, plowing it toward the discharge end of the cylinder, and assisting the water and centrifugal force to separate the lighter and heavier portions and to discharge the lighter.

When the automatic reversing mechanism is employed, the position and movement of the parts are so adjusted that at or slightly before the beginning of the separating period, and when the ends of the agitators have approached sufficiently near to the separating-surface, the weighted lever H will have been moved sufficiently to fall on the opposite side of its pivotal support, and through the intermediate mechanism will automatically shift the position of the sliding trough and reverse the direction of travel of the deflector. This receding slowly from the separating-surface gradually removes the field of action of the agitators from the same, permitting an accumulation of material to gradually form, and as heavier substances are held by centrifugal force most firmly to the separating-surface this portion forms the layer or accumulation while the lighter portions, aided by the agitator, pass toward the discharge end of the cylinder and are thrown off. This direction of travel of the parts, and the consequent accumulation of heavier material, continues to such extent and for such a time as has been predetermined by the adjustment of the automatic reversing means, at which time a reversal will take place and the direction of transverse movement of the deflector will again change and carry the ends of the agitators close to the separating-surface, loosening and plowing the accumulated heavier material toward the discharge end of the cylinder. When the agitators have reached the predetermined initial point for separation, the heavier will have been sufficiently removed to again commence the separating period.

It is preferable to stop the flow of material into the treatment-cylinder during the removal of heavier substances, or unloading period. The rapidity of movement of the deflector from the side of the treatment-cylinder and also the feed of material should be so adjusted with reference to the percentage of heavier substances contained in the material, or to the percentage it is desired to save, that the agitators will recede from the separating-surface or initial point sufficiently fast to permit such a quantity to accumulate.

It is preferable to revolve the treatment-cylinder and deflector at different speeds to increase the action of the agitating and plowing means, such differential rotation being of a degree to best suit the material under treatment. It will not be found necessary in all instances to revolve the deflector and agitators when the material being treated does not require it.

The transverse travel of the deflector is preferably faster during the unloading period than during the separating and loading period. This can be accomplished by running the belts or other driving mechanism for effecting the outward travel at a greater speed, securing a more rapid unloading of heavier material and effecting a saving of time.

The agitators not only, as hereinabove explained, serve to disturb the material coming within their field of action, assisting the water and centrifugal force to effect separation and plowing material toward the discharge end of the treatment-cylinder, but they maintain a uniform surface upon the accumulating layer and, especially when such material is submerged and circumferential currents are employed immediately, fill any channel or grooves resulting from the erosion of the surface by the flow of water, or wholly prevent the tendency of such to form.

While it is preferable to use automatic means for reversing the direction of transverse travel of the agitating and other parts and mechanical means for gradually and uniformly moving them this is not necessary, and I therefore do not desire to be restricted to details in these respects.

The term "treatment-cylinder" is generally used throughout the description, but it will be understood that the treatment vessel need not necessarily be made in the form of a cylinder, but may be of any desired shape adapted to receive the necessary parts and subserve the purpose required.

In my application, Serial No. 527,576, filed October 31, 1894, I claim certain features shown and described but not claimed herein.

What I regard as new, and desire to secure by Letters Patent, is—

1. In a centrifugal separator, the combination of an imperforate, rotatable surface upon which material is separated in layers, a deflector in proximity thereto, yieldable means for effecting agitation over said surface, and removable sections mounted on the deflector for carrying the same, substantially as described.

2. In a centrifugal separator, the combination of an imperforate, rotatable surface upon which material is separated in layers, yieldable projections for effecting agitation of material over said surface, and means for adjusting the tension or resistance of such projections, substantially as described.

3. In a centrifugal separator, the combination of an imperforate, rotatable surface upon which material is separated in layers, yieldable agitators in proximity to such surface, and springs connected to them to resist their deflection, substantially as described.

4. In a centrifugal separator, the combination of an imperforate, rotatable surface upon which material is separated in layers, yieldable agitators in proximity to such surface, and adjustable springs connected to them to resist their deflection, substantially as described.

5. In a centrifugal separator, the combination of a rotatable treatment vessel, a cylinder or deflector therein, agitators movably supported thereon, a hub movably mounted on the cylinder-shaft, and springs connecting the agitators and hub, substantially as described.

6. In a centrifugal separator, the combination of a rotatable treatment vessel, a cylinder or deflector therein, agitators movably supported thereon, a hub movably mounted on the cylinder-shaft and having projections abutting against adjustable portions on the cylinder, and springs connecting the agitators and hub, substantially as described.

7. In a centrifugal separator, the combination of a rotatable surface upon which material is separated in layers, and yieldable means for effecting agitation of material over said surface, carried by removable sections which may also be turned or rotated to regulate the tension or force of resistance of such agitators, substantially as described.

8. In a centrifugal separator, the combination of a rotatable treatment vessel, removable sections therein carrying agitators, rotatable supports for such sections, and a head or end for the treatment vessel provided with openings registering with said sections, through which they may be removed without the removal of their supporting means, substantially as described.

9. In a centrifugal separator, the combination of a rotatable separating-surface, and means for effecting agitation of material thereon, the two having a relatively differential movement at one portion of the separating-surface compared with another in a direction transverse to the axis of rotation, substantially as described.

10. In a centrifugal separator, the combination of a rotatable separating-surface, means for effecting agitation of material thereon, the two having a relatively differential movement at one portion of the separating-surface compared with another in a direction transverse to the axis of rotation, and automatic means for accomplishing this movement, substantially as described.

11. In a centrifugal separator, the combination of a rotatable separating-surface, and means for effecting agitation of material thereon, the two having a relatively differential movement at one portion of the separating-surface compared with another in a direction transverse to the axis of rotation the greatest difference in movement being near the feed end of the separating-surface, substantially as described.

12. In a centrifugal separator, the combination of a rotatable separating-surface, and rotatable means for effecting agitation of material thereover, the two having a relatively differential movement at one portion of the separating-surface compared with another in a direction transverse to the axis of rotation, substantially as described.

13. In a centrifugal separator, the combination of a rotatable separating-surface, means for effecting agitation of material thereover, the two relatively movable at one end in a direction transverse to the axis of rotation and adapted to be maintained at a substantially constant distance apart at the other, substantially as described.

14. In a centrifugal separator, the combination of a rotatable treatment vessel, means for effecting agitation of material therein, and differentially-movable journal-boxes for supporting the same, substantially as described.

15. In a centrifugal separator, the combination of a rotatable treatment vessel, means for effecting agitation of material therein, and differentially-movable journal-boxes for supporting the same provided with a swiveled supporting-joint, substantially as described.

16. In a centrifugal separator, the combination of a rotatable treatment vessel, a deflector carrying agitators therein, differentially-movable journal-boxes for supporting the same, and swiveled joints supporting said boxes for permitting their correct alinement, substantially as described.

17. In a centrifugal separator, the combination of a rotatable treatment vessel, an agitator therein, differentially-movable journal-bearings for said agitator, and rotary rods having threads of different pitch for actuating the boxes, substantially as described.

18. In a centrifugal separator, the combination of a rotatable treatment vessel, a trough or hood provided with a channel through its inner wall for receiving the discharge from the vessel, a rib at each side of said channel within the trough, and a rib at each side of said channel extending toward the cylinder, substantially as described.

19. In a centrifugal separator, the combination of a rotatable treatment vessel, a trough or hood provided with a channel through its inner wall for receiving the discharge from the vessel, a rib within said trough against which material is discharged, a rib at each side of the channel within the trough, and a rib at each side of said channel extending toward the cylinder, substantially as described.

ORRIN B. PECK.

Witnesses:
JNO. WHITE,
M. F. BRAY.

It is hereby certified that Letters Patent No. 560,634, granted May 19, 1896, upon the application of Orrin B. Peck, of Chicago, Illinois, for an improvement in "Centrifugal Separators," were erroneously issued to said Orrin B. Peck as sole owner of the invention; whereas said Letters Patent should have been issued to *The Patent Title Company, of same place,* said The Patent Title Company being assignee, by mesne assignments, of the entire interest in said invention, as shown by the assignments of record in this Office; and that the said Letters Patent should be read with this correction therein that the same may conform to the record of the case in the Patent Office.

Signed, countersigned, and sealed this 23d day of June, A. D. 1896.

[SEAL.]

JNO. M. REYNOLDS,
*Assistant Secretary of the Interior.*

Countersigned:
S. T. FISHER,
*Acting Commissioner of Patents.*